United States Patent [19]

Tanaka et al.

[11] Patent Number: 5,471,399
[45] Date of Patent: Nov. 28, 1995

[54] NETWORK MANAGEMENT SYSTEM AND NETWORK STATUS DISPLAY METHOD

[75] Inventors: Yasuhiro Tanaka, Kawasaki; Yasuhiko Nagai, Tokyo; Michio Suzuki; Takashi Kagei, both of Yokohama; Kohsuke Shinnai, Hirakata; Goro Ikeba; Masato Saito, both of Yokohama, all of Japan

[73] Assignee: Hitachi, Ltd., Tokyo, Japan

[21] Appl. No.: 931,201

[22] Filed: Aug. 17, 1992

[30] Foreign Application Priority Data

Aug. 28, 1991 [JP] Japan .................................. 3-216916

[51] Int. Cl.$^6$ ............................................ G06F 11/32
[52] U.S. Cl. ...................... 364/491; 395/600; 395/161; 395/185.1; 395/184.9; 370/13
[58] Field of Search .................................. 364/488, 489, 364/491; 371/29.1; 395/575, 919, 921

[56] References Cited

U.S. PATENT DOCUMENTS

| | | | |
|---|---|---|---|
| 4,970,664 | 11/1990 | Kaiser et al. | 364/488 |
| 5,226,120 | 7/1993 | Brown et al. | 395/200 |
| 5,295,230 | 3/1994 | Kung | 395/75 |
| 5,299,207 | 3/1994 | Fujii | 371/29.1 |
| 5,317,568 | 5/1994 | Bixby et al. | 370/85.6 |

*Primary Examiner*—Vincent N. Tans
*Attorney, Agent, or Firm*—Fay, Sharpe, Beall, Fagan, Minnich & McKee

[57] ABSTRACT

In a network management system, information items respectively of connection relationships, containment relationships, and display priority of a plurality of managed object instances (resources) are stored in a memory. According to a predetermined algorithm, there is calculated an evaluated value for display for each of the instances depending on the containment relationship information and display priority to select a limited number of instances representable on a screen. Displayed on the screen is a network layout diagram including icons representing the plural instances thus selected. When the user specifies one of the icons, the specified instance and a number of representable instances selected according to the evaluated values from a group of instances under the specified instance in the containment relationships are displayed in a new network layout diagram on the screen. When a fault occurs in either one of the instances, if an icon of the faulty instance is being displayed on the screen, the color thereof is changed into a second color. If the icon is not displayed on the screen, the color of icons being displayed for instances as high-ranking resources with respect to the faulty instance in the containment relationships is changed into a third color.

11 Claims, 15 Drawing Sheets

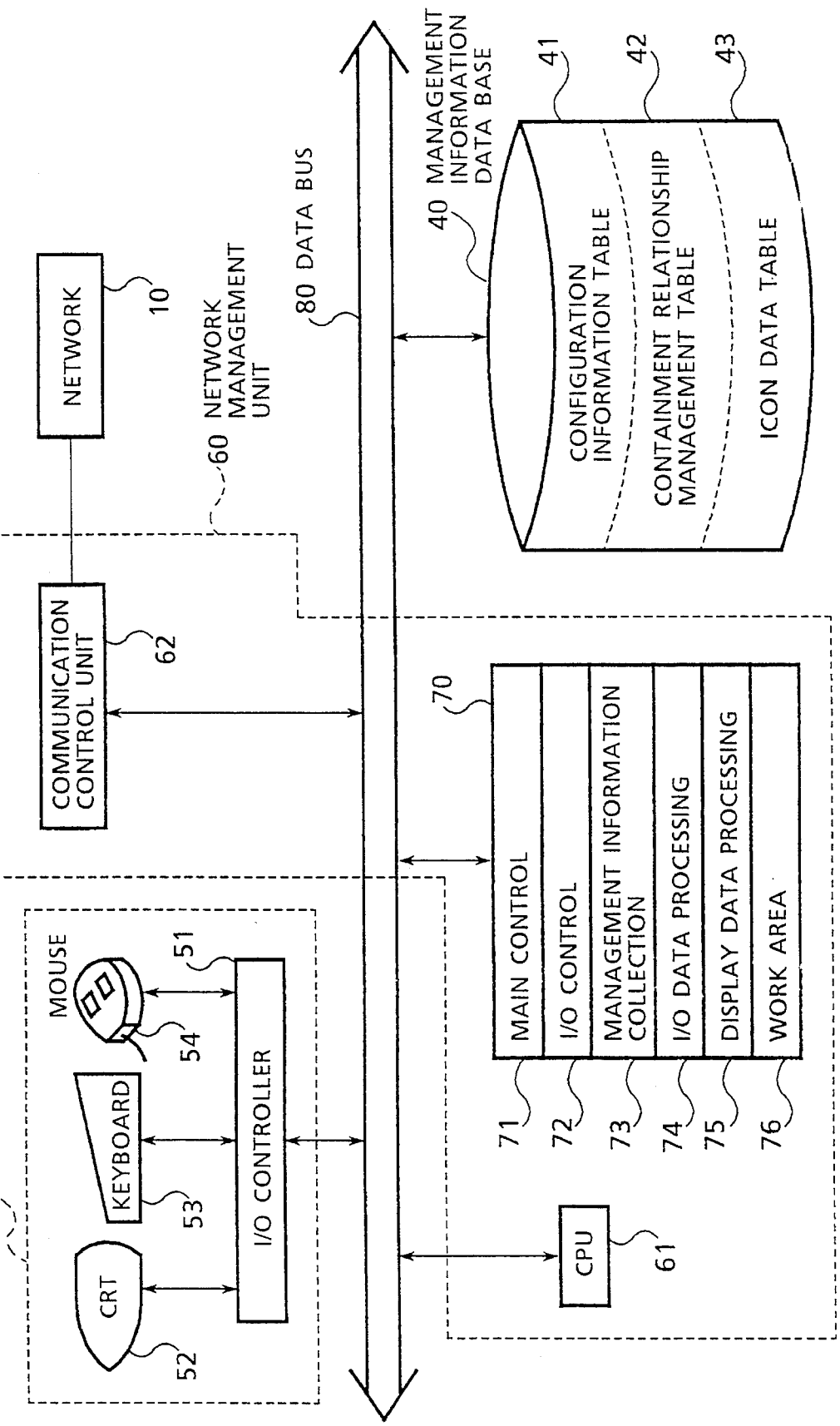

FIG.3

| | MANAGED OBJECT NAME | MANAGED OBJECT ADDRESS | CONNECTION RELATIONSHIP | | |
|---|---|---|---|---|---|
| 11 | HOST A | (ADDRESS) | EXCHANGE A | EXCHANGE C | |
| 12 | HOST B | (ADDRESS) | EXCHANGE B | | ------- |
| 13 | HOST C | (ADDRESS) | EXCHANGE D | | ------- |
| 14 | EXCHANGE A | (ADDRESS) | HOST A | MULTI-PLEXER A | ------- |
| 15 | EXCHANGE B | (ADDRESS) | HOST B | MULTI-PLEXER B | ------- |
| 16 | EXCHANGE C | (ADDRESS) | HOST A | MULTI-PLEXER C | ------- |
| 17 | EXCHANGE D | (ADDRESS) | HOST C | MULTI-PLEXER D | ------- |
| 18 | MULTI-PLEXER A | (ADDRESS) | EXCHANGE A | MULTI-PLEXER B | ------- |
| 19 | MULTI-PLEXER B | (ADDRESS) | EXCHANGE B | MULTI-PLEXER A | ------- |
| 20 | MULTI-PLEXER C | (ADDRESS) | EXCHANGE C | MULTI-PLEXER D | ------- |
| 21 | MULTI-PLEXER D | (ADDRESS) | EXCHANGE D | MULTI-PLEXER C | ------- |

FIG. 6

| CLASS | ICON DATA |
|---|---|
| HOST | |
| EXCHANGE | |
| MULTIPLEXER | |
| TERMINAL | |

| | | 100 |
|---|---|---|
| 41A — MANAGED OBJECT NAME | HOST D | |
| 41B — MANAGED OBJECT ADDRESS | (ADDRESS) | |
| 422 — CLASS | HOST | |
| 423 — DISPLAY PRIORITY | 9 | |
| 425 — ATTRIBUTE INFORMATION | (ATTRIBUTE INFORMATION) | |
| 429 — CONTAINED MANAGED OBJECT NAME | HOST A | |
| 41C — CONNECTED MANAGED OBJECT NAME | EXCHANGE D | |

| | | 101 |
|---|---|---|
| 41A | MANAGED OBJECT NAME | EXCHANGE A |
| 41B | MANAGED OBJECT ADDRESS | (ADDRESS) |
| 422 | CLASS | EXCHANGE |
| 430 | FAULT IMPORTANCE | MAJOR |
| 425 | KIND OF FAULT | (ATTRIBUTE INFORMATION) |

440

| FAULT IMPORTANCE (430) | F (431) |
|---|---|
| Critical | 5 |
| Major | 4 |
| Minor | 3 |
| Indeterminate | 2 |
| Warning | 1 |
| Normal | 0 |

NETWORK MANAGEMENT SYSTEM AND NETWORK STATUS DISPLAY METHOD

BACKGROUND OF THE INVENTION

1. Field of the Invention

The present invention relates to a network management system, and in particular, to a network management system having a display for and a network status display method of displaying a network configuration and a network operation status.

2. Description of the Related Art

The network management system is installed to enhance efficiency of the network operation.

To implement the network management system as a management information model according to an object-oriented design, discussion has been conducted on international standards in the International Organization for Standardization (ISO), namely, "ISO/IEC/DP10165-1" and "ISO/IEC/DP10165-4".

Moreover, in the Proceedings of the 1990 IEICE (the Institute of Electronics, Information and Communication Engineer of Japan) Spring Conference (B-606), there has been proposed a method of displaying a network configuration and a network operation status in a screen image constructed in association with a management information model according to the object-oriented design above.

In the communication network management and display method above, various resources to be managed or managed object instances are related to icons abstractly expressed according to the object-oriented design such that the network configuration and network operation status are displayed by use of the icons.

Actually, since a communication network includes a large amount of managed object instances, it is impossible for the display method above to present for all of the instances on a screen. Namely, there will be naturally displayed necessary instances selected in an appropriate fashion. In consequence, an essential technological problem resides in how to selectively display a group of important managed object instances in a display screen having a limited size and how to reflect onto the screen status changes of managed object instances not currently being displayed on the screen.

SUMMARY OF THE INVENTION

It is therefore an object of the present invention to provide a network management system having a display and a network status display method in which only a portion of important managed object instances of the network can be displayed and managed object instances being concealed from the view can be easily displayed on the screen.

In order to achieve the object above, according to the present invention, there is provided a communication network management system including means storing therein containment relationships beforehand defined between a plurality of managed object instances (resources) constituting the network, means for calculating for each of the instances an evaluated value for display and selecting a limited number of instances based on the evaluated values, the instances being representable on a screen of a display, and means for generating a layout diagram including a plurality of icons representing the plural selected instances and displaying the diagram on the screen. Resultantly, only a portion of the managed object instances, the portion including essential instances for the network management, can be selectively displayed on the screen.

According to a feature of the network management system of the present invention, there is disposed means to be operated by the user to specify one of a plurality of icons displayed on the screen. When the user specifies from the specifying means either one of the icons respectively related to the instances, the means for selecting a display instance selects, from a group of instances including the specified instance and lower-ranking instances contained in a range of the specified instance, a group of instances representable on the screen based on the containment relationships stored in the storing means. The means for generating the layout diagram creates a new layout diagram including the selected instances and then displays the diagram on the screen. As a result, there can be displayed on the screen a group of managed object instances having a lower display priority and not being displayed on the screen.

According to another feature of the network management system of the present invention, there is beforehand displayed on the screen a layout diagram constituted with a plurality of icons related to the instances in a first display format. When a fault occurs in a managed object instance corresponding to either one of the icons being displayed on the screen, a state of the icon is changed into a second display format. When a fault occurs in a managed object instance not being displayed on the screen, a state of a particular icon being displayed on the screen is changed into a third display format, the icon being associated with a managed object instance which is arranged at a level higher than that of the faulty instance according to the containment relationships.

According to still another feature of the network management system of the present invention, when a fault report message of a fault in a managed object instance is received from the network, a fault evaluation value is determined according to information indicating a fault importance contained in the message. If the evaluated value is not less than a predetermined threshold value, the state of an icon of the managed object instance is changed; otherwise, the notification of the occurrence of the fault is prevented from being displayed on the screen.

The foregoing and other objects, manner of the operation and novel features of the present invention will be understood from the following detailed description when read in conjunction with the accompanying drawings.

BRIEF DESCRIPTION OF THE DRAWINGS

FIG. 2 is a diagram showing the construction of a network management system according to the present invention;

FIG. 3 is a diagram showing an example of a configuration information table;

FIG. 6 is a diagram showing an example of an icon data table;

FIG. 7 is a diagram showing an example of the format of a configuration change report message;

DESCRIPTION OF THE PREFERRED EMBODIMENTS

Description will now be given of the embodiments according to the present invention. However, it is to be understood that the present invention will not be restricted by the embodiments.

First embodiment

Figure 1:
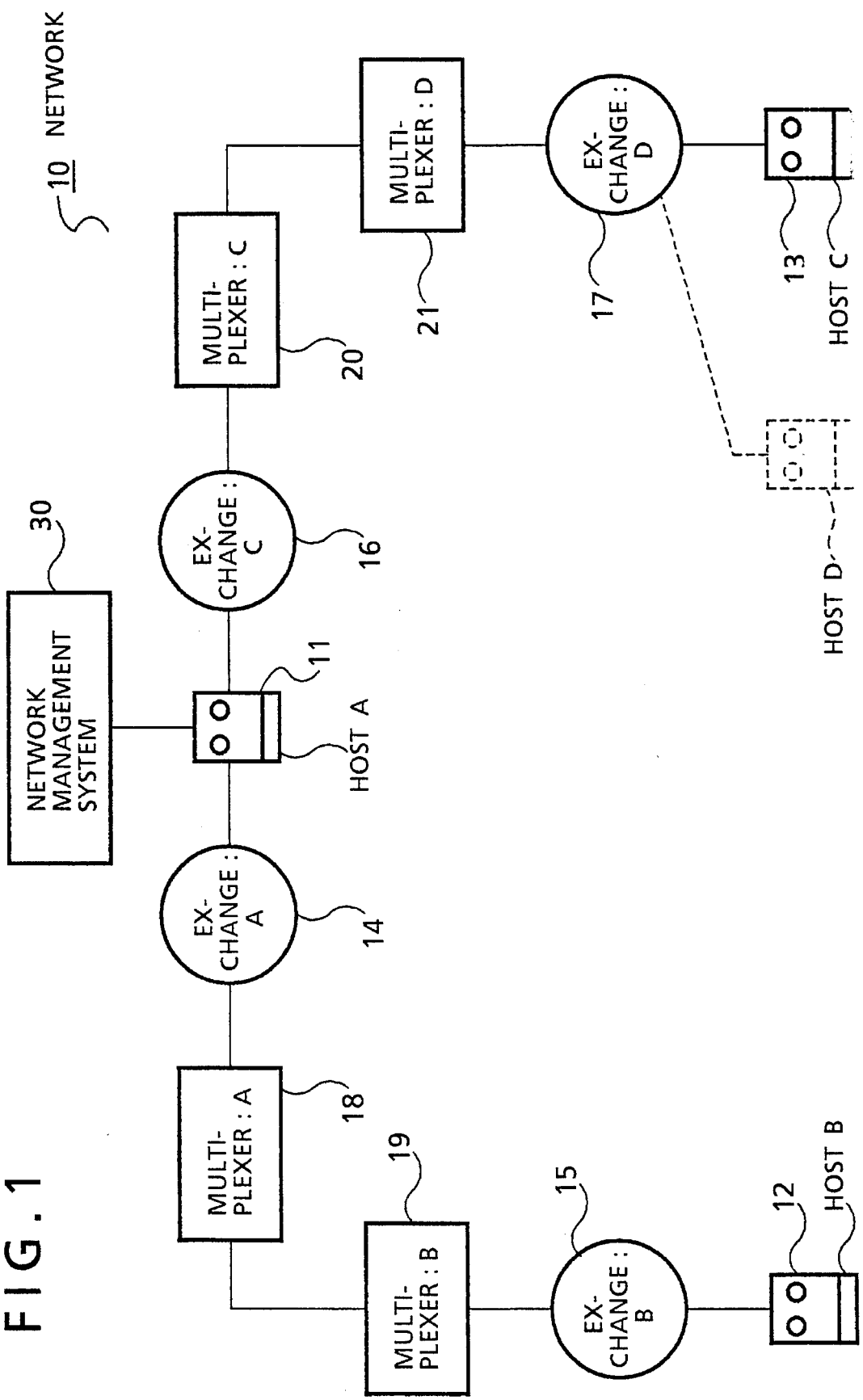
FIG. 1 is a schematic diagram showing the configuration of an example of the network managed by a network management system according to the present invention.

FIG. 1 shows an example of a communication network 10 to be managed by a network management system 30 having a display. The network 10 includes a host computer A (HOSTA) 11 connected to the system 30, a host computer B (HOSTB) 12 connected to the HOSTA 11 via an exchange A 14, a multiplexer A 18, and a multiplexer B 19 and an exchange B 15; and a host computer C (HOSTC) 13 connected to the HOSTA 11 via an exchange C 16, a multiplexer C 20, a multiplexer D 21, and an exchange D 17.

FIG. 2 shows the constitution of the network management system 30.

The system 30 includes a management information data base 40, an interface unit 50, and a network management unit 60.

The data base 40 includes a configuration information table 41 for storing therein configuration information related to a plurality of managed object instances constituting the network 10, a containment relationship management table 42 for storing therein management information of the object instances, and an icon data table 43 for storing therein screen display information.

The interface unit 50 is constituted with a display or a cathode-ray tube (CRT) 52, a keyboard 53, a mouse 54, and an input/output controller 51 for connecting these constituent components to a data bus 80.

The network management unit 60 includes a central processing unit (CPU) 61, a communication control unit 62, and a memory 70. The memory includes an area 71 for storing therein a program controlling the overall operations of the network management system 30, an area 72 for storing therein a program controlling inputs from the user or operator and outputs thereto, an area 73 for storing therein a program collecting management information of the network 10, an area 74 for storing therein a program processing data supplied from the user, an area 75 for storing therein a program processing display data to be presented on the display screen, and a work area 76.

FIG. 3 shows the contents of the configuration information table 41.

The table 41 is constituted with a plurality of records 11 to 21 prepared for the respective managed object instances. Each record includes a field 41A representing a name of a managed object instance, a field 41B denoting an address thereof, and a field 41C indicating a connection relationship. In the field 41C, there is stored a name of another managed object instance connected to the instance designated by the field 41A.

Figure 4:
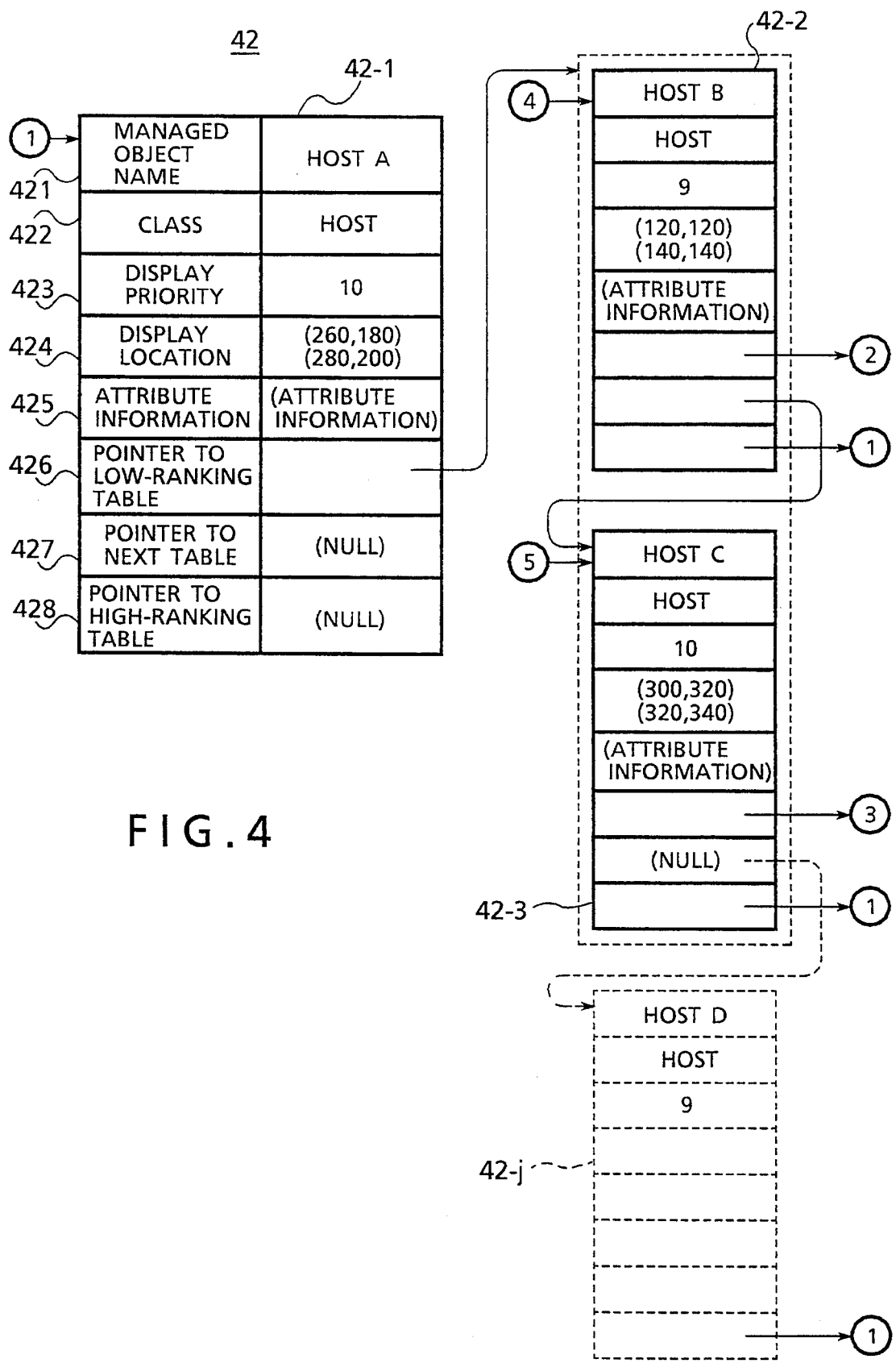
FIG. 4 is a diagram showing a portion of a containment relationship management table.
Figure 5:
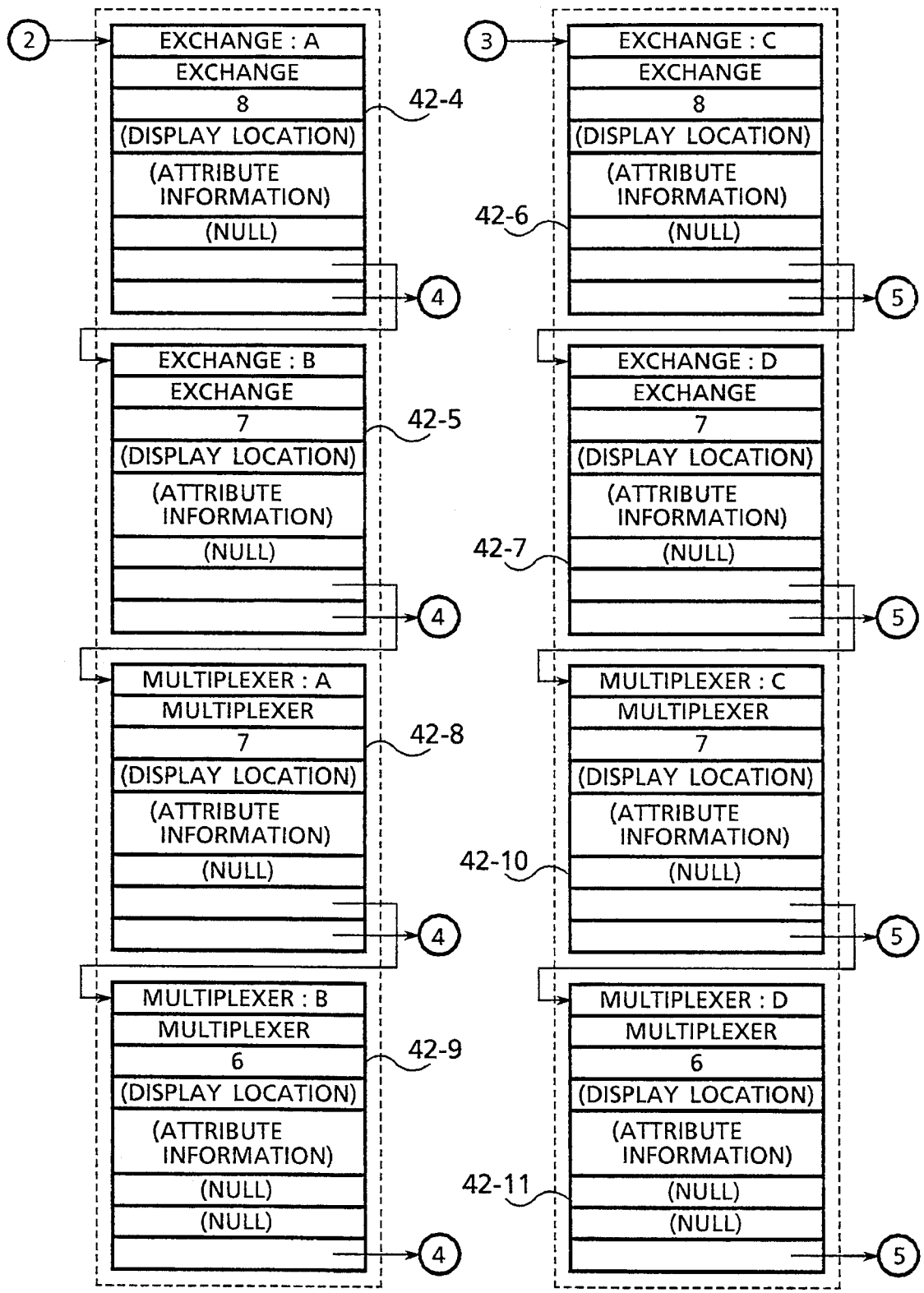
FIG. 5 is a diagram showing another portion of the containment relationship management table.

FIGS. 4 and 5 show an example of the structure of the containment relationship management table 42.

The table 42 is constituted with a plurality of sub-tables 42-1 to 42-11 respectively corresponding to the managed object records 11 to 21 registered to the configuration information table 41. In this configuration, these sub-tables are mutually connected therebetween according to the managed object containment relationships in the network management.

Each sub-table 42-i includes the following data items.

421: Managed object name 41A registered to the configuration information table.

422: Name of a class to which the managed object instance belongs. Incidentally, the term "class" in this context denotes a set of managed object instances each having identical attribute information 425. For example, "host" "exchange" "multiplexer" and "terminal" are assigned as class names.

423: Display priority for displaying the managed object instance on the screen. Ten priority levels are employed with the lowest level numerically expressed as "1" and the highest level represented as "10". In the containment relationship (containment tree), managed object instances arranged on the side of its parent (root) side have a display priority level equal to or greater than a display priority of managed object instances on its child side (leaf side).

424: Coordinates indicating a display position of the managed object instance on the display screen. When the instance is not to be presented on the screen, "null" is stored in this field.

425: Attribute information of the instance.

426: Pointer from the sub-table of the managed object instance to a sub-table for a managed object instance at a lower rank with respect to the pertinent managed object in the containment relationship. When there does not exist any low-ranking instance, "null" is stored in this field.

427: Pointer from the sub-table of the managed object instance to a sub-table for a managed object instance at an equivalent rank with respect to the pertinent managed object in the containment relationship. When there does not exist any such equivalent-ranking instance, "null" is stored in this field.

428: Pointer from the sub-table of the managed object instance to a sub-table for a managed object instance to be the parent of the pertinent managed object in the containment relationship. In a sub-table of a managed object instance arranged at the root position in the containment relationship, "null" is stored in this field.

In the containment relationship table shown in FIG. 4, "host A" 42-1 is arranged as the root of the containment tree; "host B" 42-2 and "host C" 42-3 follow "host A" 42-1; "exchange A" 42-4, "exchange B" 42-5, "multiplexer A" 42-8 and "multiplexer B" 42-9 are located under "host B" 42-2; and "exchange C" 42-6, "exchange D" 42-7, "multiplexer C" 42-10, and "multiplexer C" 42-11 follow "host C" 42-3.

FIG. 6 shows an example of the constitution of the icon data table 43.

In this table 43, there is defined icon data 43B for each class name 43A to represent a managed object instance associated with the class.

The contents of the configuration information table 41 and the containment relationship table 42 are updated in response to a configuration change report message 100 shown in FIG. 7 which is issued from a sub-management unit, not shown in FIG. 1, or from a managed object unit additionally installed in the network and then inputted to the system 30 via the communication control unit 62.

The message 100 includes a name 41A of a new managed object instance to be added, an address 41B thereof, a class 422, a display priority 423, attribute information 425, a name 429 of a managed object instance at a higher rank with respect to the pertinent instance in the containment relationship, and a name 41C of a managed object instance connected to the pertinent instance. In this diagram, for an easy understanding of the correspondence relationships between the data items above and those of the tables 41 and 42, the data items of the message 100 are assigned with the same reference numerals as those of the data items of FIGS. 3 and 4.

On receiving the configuration change report message 100, the network management system 30 adds to the configuration information table 41 of FIG. 3 a new record containing the new instance name 41A, the instance address 41B, and the connection relationship 41C. Moreover, a new sub-table 42-j to be added to the containment relationship management table 42 is generated. In order to arrange the new instance to follow the instance designated by the field 429 of the message 100, a pointer to the new sub-table 42-j is set to an appropriate position of the table 42. In this situation, the configuration display processing of FIG. 13, which will be described later, is executed.

In this example, the sub-table 42-j for the new instance "host D" created in response to the reception of the message 100 is linked with the next table pointer 427 of the sub-table 42-3 as indicated by a dotted line in FIG. 4

Next, the operation of the network management system 30 will be described.

Figure 8:
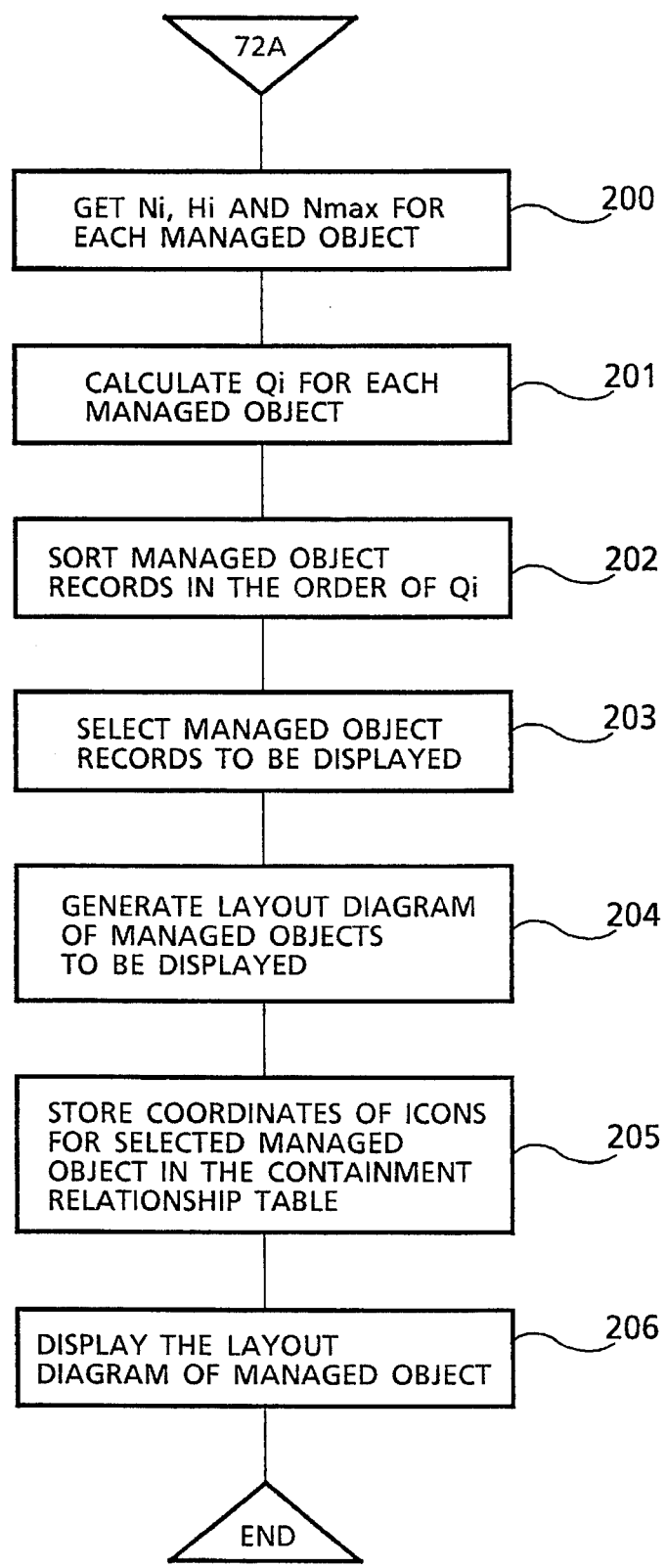
FIG. 8 is a flowchart showing the operation of a configuration display processing executed in the network management system.

The flowchart of FIG. 8 shows the operation of the configuration display processing executed by the CPU 61 when the operation of the system 30 is started or when a configuration change report message is received.

Step 200: Referencing the containment relationship table 42 in the management information data base 40, there is obtained, for each managed object instance (42-1 to 42-j), a hierarchy level Ni in the containment tree, a display priority Hi, an a hierarchy level Nmax of a managed object instance at the lowest level or rank related to the pertinent instance. A numeric data record containing the attained data items and the instance name is stored in the work area 76.

In this connection, the hierarchy level Ni of the instance i is determined as follows. In the containment relationships (containment tree) shown in FIGS. 4 and 5, assume that the hierarchy levels are assigned as follows. Namely, the sub-record 42-1 arranged at the root position is assigned with a hierarchy level "1" and the sub-records 42-2, 42-3, and 42-j at the next positions are assigned with a hierarchy level "2". In this case, the hierarchy level Ni is assigned to the sub-record 42-i for the management object instance i. The lowest hierarchy level Nmax is possessed by the sub-record arranged at the lowest rank in the tree portion to which the sub-record 42-i belongs. In the example of FIGS. 4 and 5, Nmax is three for any object instances. The display priority Hi is indicated by a value stored in the display priority field 423 of the sub-record 42-i of the object instance i.

Step 201: A display evaluation value computing routine contained as a portion of the display data processing program in the memory 75 computes an evaluated value Qi for each managed object instance i according to the following formula for evaluation.

$$Qi = \{(Nmax - Ni) + 1\} \cdot Hi/Nmax \quad (1)$$

As can be seen from this formula, for example, even when two managed object instances A and B have an identical display priority Hi and an identical hierarchy level Ni, if the instance A has a hierarchy layer of low-ranking managed object instances and the instance B has two hierarchy layers of low-ranking managed object instances, the instance B having the larger number of hierarchy layers are assigned with a larger value Qi for a higher display priority.

Step 202: The numeric data records of the instances stored in the work area 76 are sorted in a descending order of the evaluated values Qi for display.

Step 203: The records are then processed in the resultant order such that there are selected a predetermined maximum number of sub-records (representable object instances) which can be displayed in a display screen.

Step 204: For each managed object instance thus selected in the step 203, the icon data table 43 is accessed to obtain the class thereof and the icon data 43B associated therewith, and the configuration control table 41 is accessed to obtain the connection relationship information 41C defined therein, thereby producing data of the network configuration layout to be displayed on the screen.

Step 205: Each managed object instance i selected in the step 203 and the coordinates of the associated icon on the display screen are stored in the related sub-record 42-i of the containment relationship management table 42. In this operation, the system clears the display position field of each sub-record for any managed object instance not to be displayed.

Step 206: According to the layout data thus created in the step 204, the network configuration is displayed on the screen.

Figures 9, 11, 12:
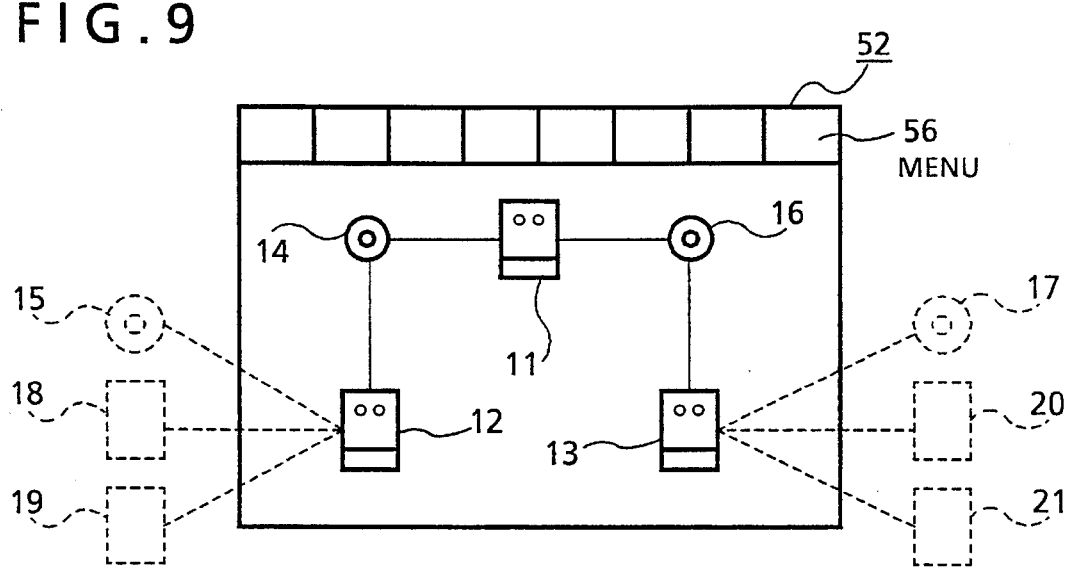
FIG. 9 is a diagram showing an example of a basic network configuration display image presented on a display screen of the network management system.
FIG. 11 is a diagram showing an example of the format of a fault report message.
FIG. 12 is a diagram showing an example of a conversion table for converting a fault importance reported by the fault report message into a numeric value.

FIG. 9 shows an example of the network configuration displayed on the screen when the operation of the system 30 is initiated. In this example, a network constituted with managed object instances (icons) 11, 12, 13, 14, and 16 having higher display evaluated values are presented on the screen. Managed object instances 15, 17, and 18 to 21 having lower display evaluated values are not presented on the screen, namely, these instances are concealed from the view. As above, the managed object instances to be displayed on the screen are chosen according to the evaluated values Qi determined on the basis of the hierarchy levels of the respective instances in the containment relationship management table 42 and the display priority of each instance. In this case, consequently, when compared with the case where the instances to be presented are selected only according to the containment relationships, the user can easily recognize the state of the network based on the displayed screen image.

In the state of the network shown in FIG. 9, assume that the configuration change report message 100 of FIG. 7 is received. If the display evaluation value of the new managed object instance (host D) thus added to the system is higher than the evaluated value of any one of other object instances, the screen image is changed to include an icon indicating the new instance (host D).

Figure 10:
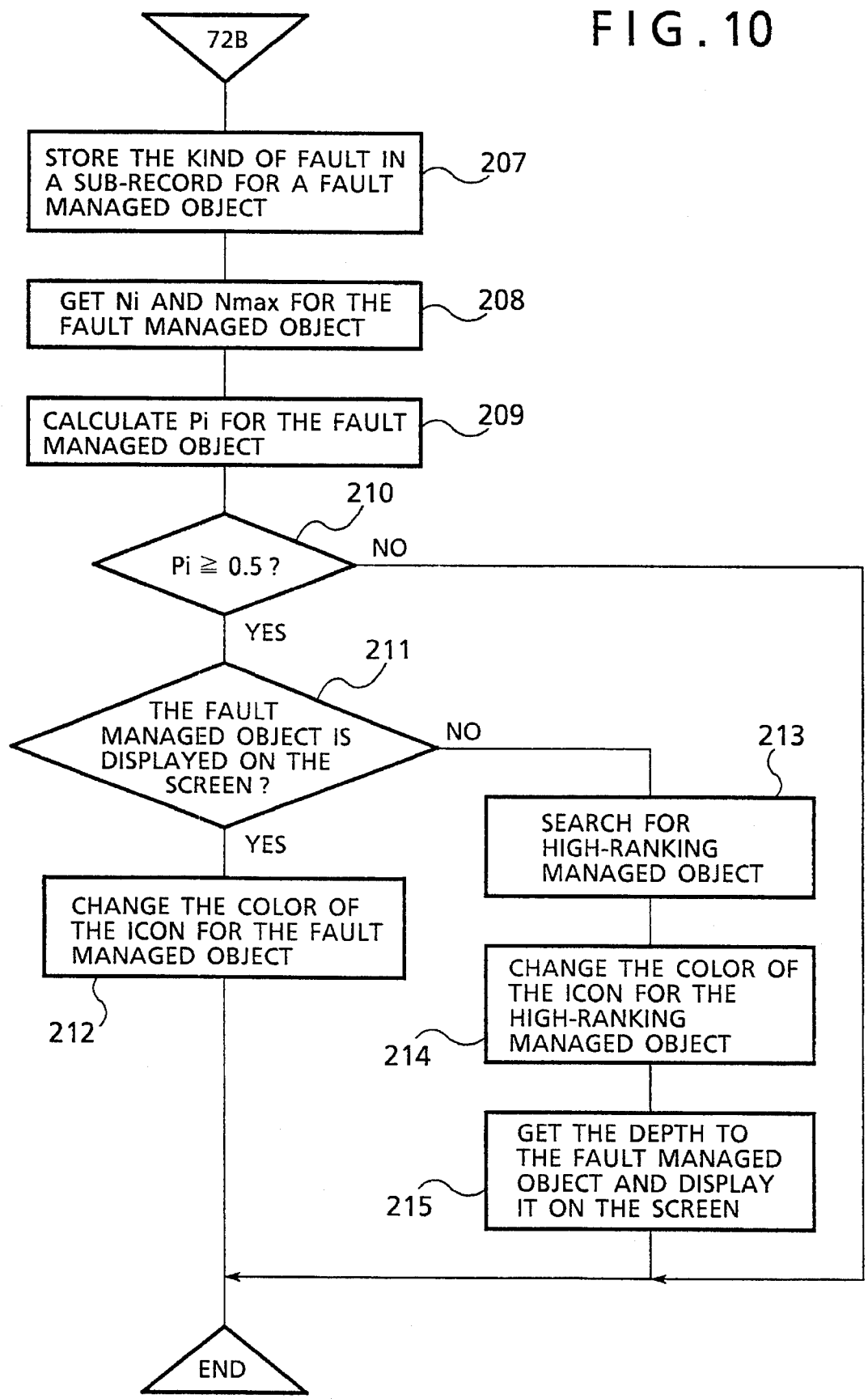
FIG. 10 is a flowchart showing the operation of a fault display processing executed in the network management system.

FIG. 10 is a flowchart showing the operation of the fault display processing to be executed by the CPU 61 when a fault report message 101 is received. When a fault takes place in either one of the managed object instances, a fault report message 101 is notified to the network management system 30 from a sub-network management system in the network or from the pertinent instance associated with the fault. As shown in FIG. 11, the message 101 includes, for example, such information items of the faulty instance as a name 41A, an address 41B, a class 422, a fault importance 430, and the contents of fault 425.

Step 207: The contents of fault thus reported are written in the attribute information field 425 of the sub-record 42-i corresponding to the managed object instance i denoted by the object name 41A of the fault report message 101.

Step 208: Like in the step 200 described above, a hierarchy level Ni of the pertinent instance i and the lowest hierarchy level Nmax are obtained from the containment relationship management table 42.

Step 209: The fault importance 430 notified by the message 101 is expressed in the ISO codes and hence is converted into a numeric value (Fi) 431 based on a conversion table 440 of FIG. 12. The fault importance value Pi is then attained as follows.

$$Pi = W1 \cdot Fi/5 + W2 \cdot (Nmax - Ni)/Nmax \qquad (2)$$

$$W1 + W2 = 1 \qquad (3)$$

where, W1 and W2 are parameter values preset in the display data processing program. These values are determined according to the user specification, namely, which one of the fault importance Fi and the hierarchy level Ni takes precedent for the selection of a managed object instance to be displayed. For example, when the fault importance Fi takes precedence over the hierarchy level Ni for the selection of the display instance, W1 takes a value larger than that of W2. Conversely, when the hierarchy level Ni takes a higher priority for the selection, the value of W1 becomes to be smaller than that of W2.

Step 210: A check is made to decide whether or not the evaluated value for fault Pi is equal to or greater than 0.5. If this is the case, control proceeds to a step 211; otherwise, the processing of this routine is terminated without displaying the fault occurrence report.

Step 211: A judgement is conducted to determine whether or not the pertinent instance in the fault has already been presented on the CRT 52.

Specifically, a check is made to decide whether or not coordinate data has already been stored in the display position field 424 of the sub-record 42-i in the containment relationship management table 42 in association with the object instance. If this is the case, the processing proceeds to a step 212; otherwise, control transfers to a step 213.

Figure 13:
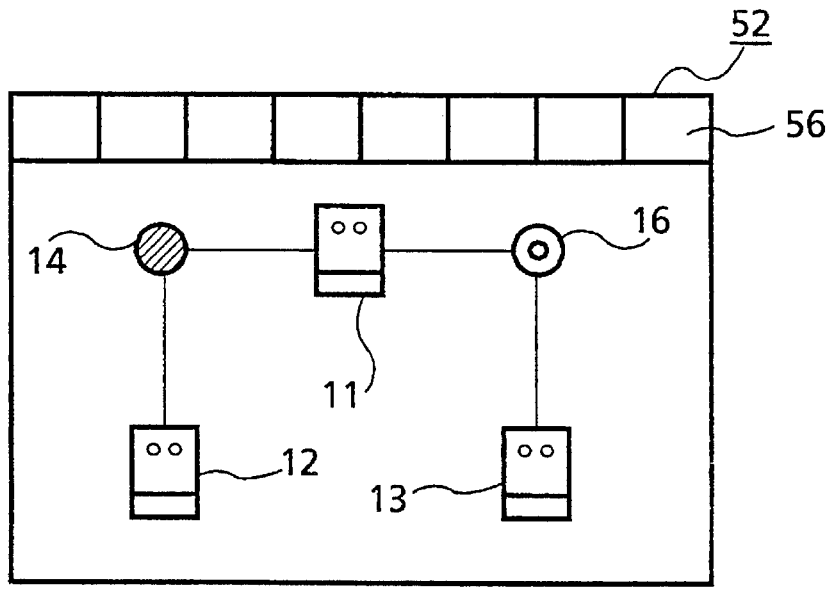
FIG. 13 is a diagram showing an example of the screen image presented at an occurrence of a fault.

Step 212: The color of the icon designating the faulty instance is changed. FIG. 13 shows an example of the screen image displayed at an occurrence of a fault in the exchange A 14. The icons of normal managed object instances are displayed in blue, whereas the color of icon of the instance (exchange A) 14 in the fault state is changed from blue to red.

Step 213: A retrieval is achieved through the managed object instances being displayed on the CRT 52 to detect any instances at a level higher than that of the pertinent instance. More concretely, the search is made through the containment relationship management table 42 to obtain the sub-tables of the instances which are currently being presented on the CRT 52 and which are at a level higher than that the sub-table 42-i of the instance in the fault.

Step 214: For the retrieved instances at the higher levels, the color of peripheral areas of icons thereof is changed.

Step 215: For each retrieved instance, the number of hierarchy levels existing from the instance to the faulty instance is determined and is displayed in the proximity of the icon of the instance at the higher level.

Figure 14:
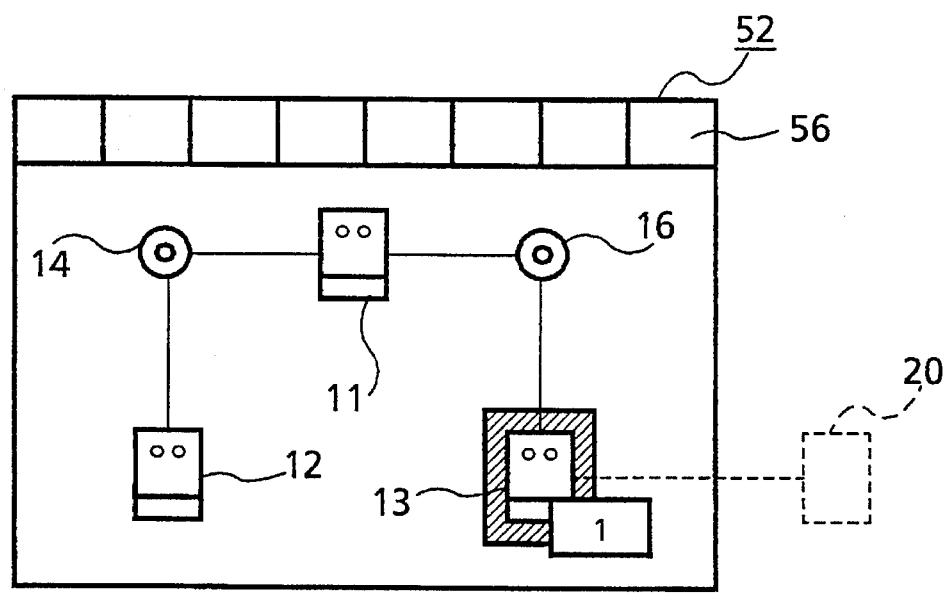
FIG. 14 is a diagram showing another example of the screen image presented at an occurrence of a fault.

FIG. 14 shows an example of the screen image displayed when a fault occurs in the multiplexer C 20 as the managed object instance which is kept in the concealed state up to this point. In this example, the color of periphery of the icon denoting the HOSTC 13 at a level higher than that of the multiplexer C 20 in the fault is changed to red. Moreover, a numeral "1" indicating the hierarchy depth or distance from the HOSTC 13 to the multiplexer C 20 is presented in the neighborhood of the icon designating the HOST 13 as a result of execution of the step 215.

Figure 15:
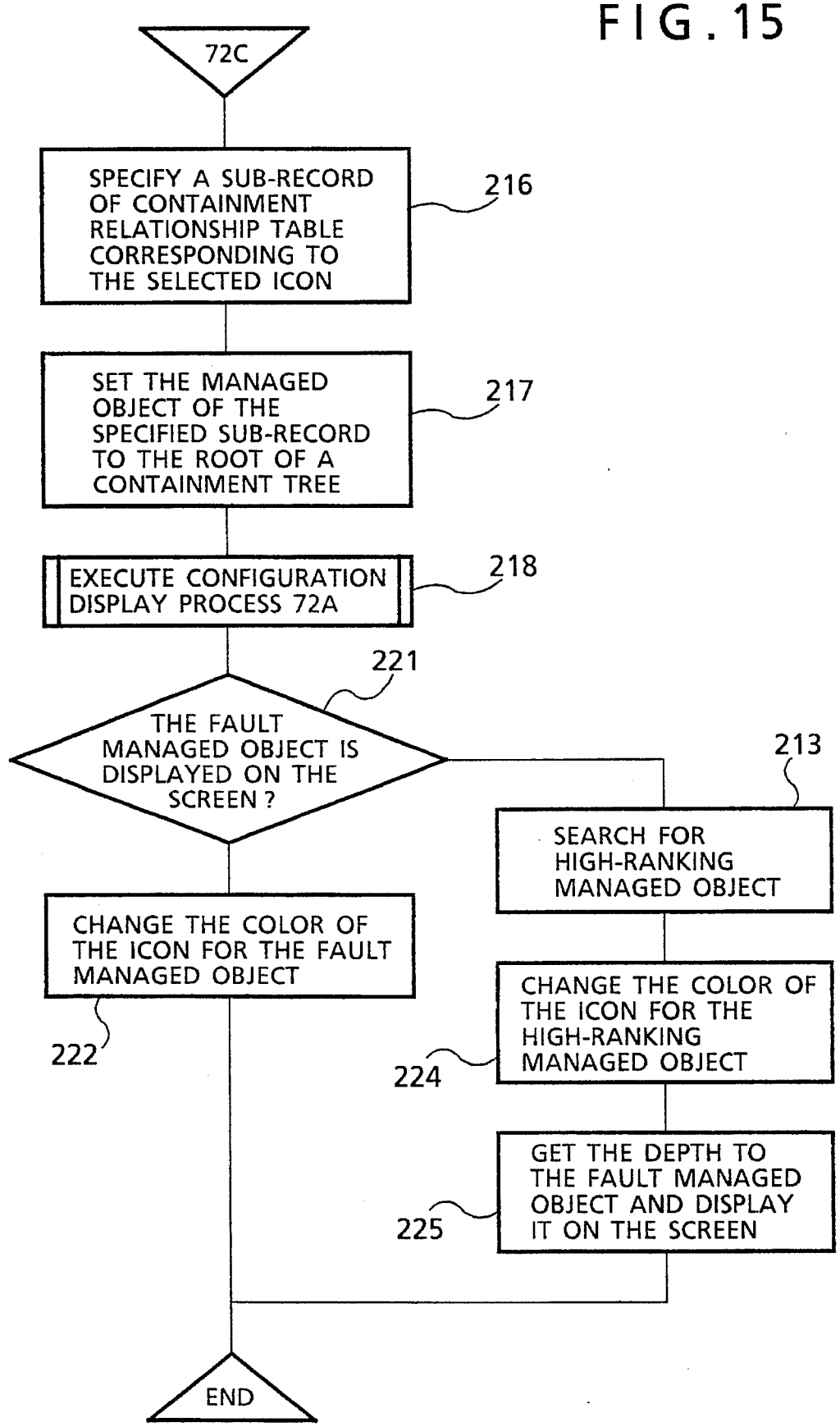
FIG. 15 is a flowchart showing the operation of a screen display change processing executed in the network management system.

FIG. 15 is a flowchart showing the operation of the screen display change processing. In the display state of the screen of FIG. 14, when the user operates the mouse 54 to pick the icon 13 of which the peripheral color is changed, the screen display change processing is executed.

Step 216: A search is made through the containment relationship management table 42 to detect a sub-record 42-i corresponding to a managed object instance i denoted by the specified icon.

Step 217: The designated instance i is set as the root of the hierarchy tree.

Step 218: The configuration display processing routine described in conjunction with FIG. 8 is executed.

Steps 221 to 225: Processing similar to that of the steps 211 to 215 of FIG. 10 is conducted.

Figure 16:
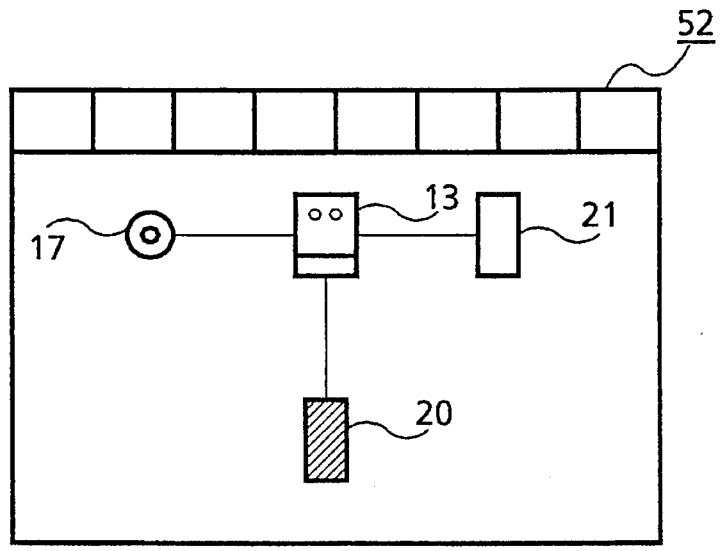
FIG. 16 is a diagram showing an example of the screen image presented as a result of an occurrence of a fault.

When the user specifies an icon designating the HOST 13 in the screen of FIG. 14, the screen image is changed, for example, as shown in FIG. 16. Namely, with the HOSTC 13 set as the root, there are displayed the faulty exchange C20, the multiplexer D21, and the exchange D17 respectively connected to the HOSTC 13. The exchange C 20 in the fault is presented in red so as to be discriminated from the normal object instances displayed in blue.

As can be seen from the states of the screen images thus displayed above, according to the present invention, the status of the network in a complex configuration including a large number of managed object instances can be displayed for management in the format which facilitates the user to recognize the states of important managed object instances and the state of any managed object instance in a fault.

Second embodiment

Figure 17:
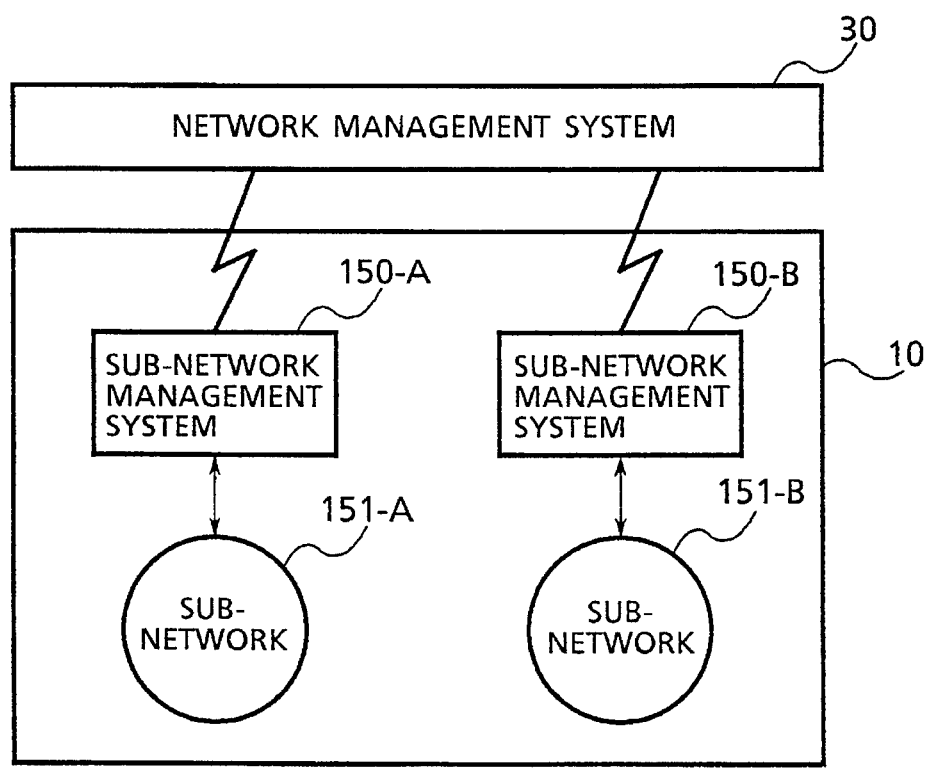
FIG. 17 is a schematic diagram showing the configuration of another example of a network managed by a network management system according to the present invention.

FIG. 17 shows a communication network 10 managed in the form of a plurality of sub-networks 151 (151-A and 151-B). Each sub-network 151-i includes, like in the case of the first embodiment, a plurality of managed object instances (resources) having containment relationships therebetween.

The sub-network 151-i is managed by a sub-network management system 150-i. A range of management of the sub-network management system 150-i is called a "management domain".

A network management system 30 is connected to the plural sub-network management systems 150-i to control the network 10 in response to reports (network management information) from the sub-network management systems 150-i. Also in the management network for communicating management information, the resources (30 and 150-i) have containment relationships therebetween. The management network above can be implemented by use of a portion of the communication network 10.

Figure 18:
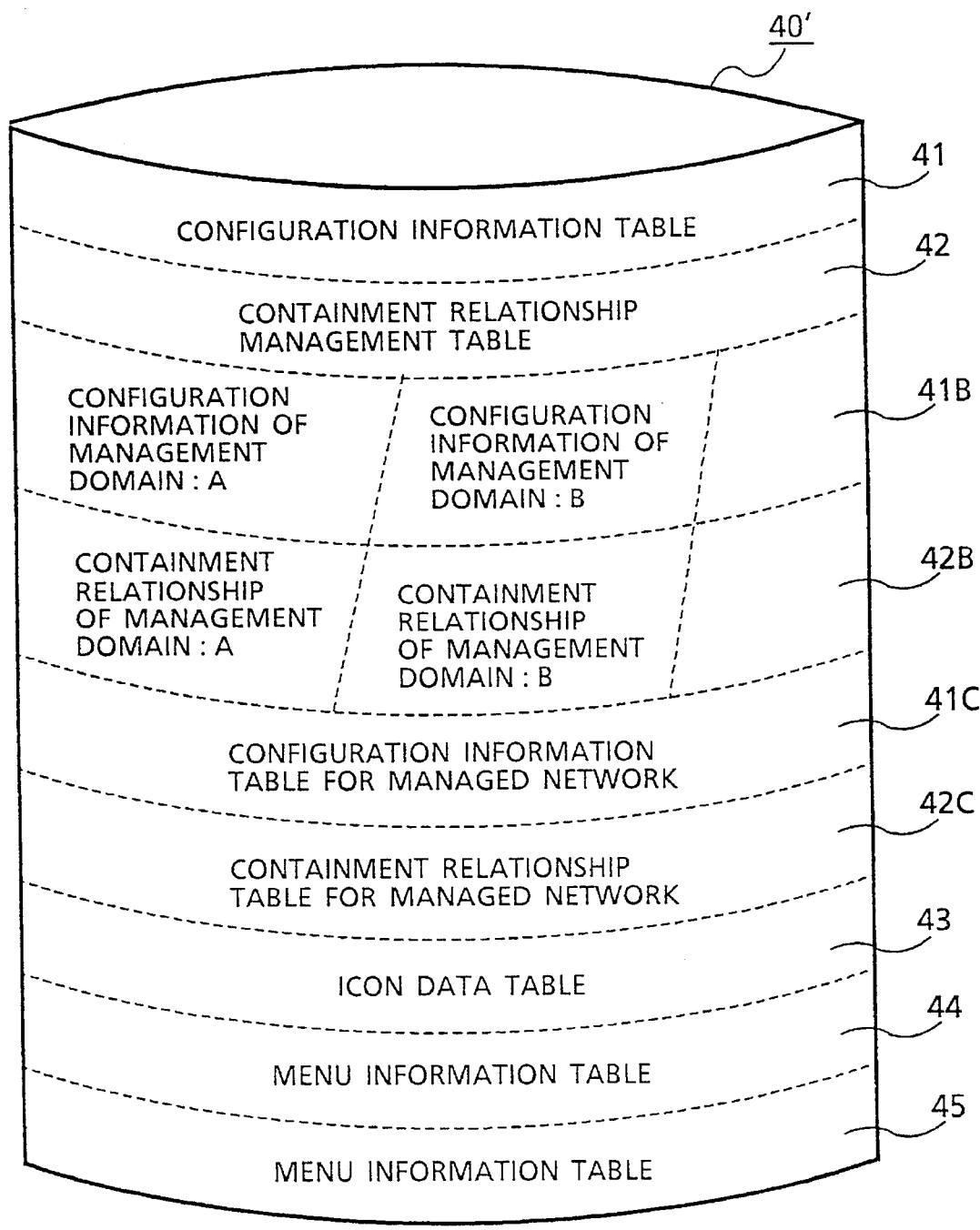
FIG. 18 is a diagram illustratively showing an embodiment of a management information data base.

The configuration of the network management system 30 of this embodiment is almost identical to that of the first embodiment of FIG. 2. Only a management information data base 40 is replaced with a data base 40' in the construction of FIG. 18.

In short, the management information data base 40' is constituted with a configuration information table 41 for storing therein the overall configuration information of the network 10, a containment relationship management table 42, an icon data table 43, a plurality of configuration information tables 41B prepared for the respective management domains, a plurality of containment relationship management tables 42B for the respective management domains, a configuration information table 41C for the managed network, a containment relationship management table 42C for the managed network, a menu information table 44, and a menu attribute table 45.

The tables 41B, 42B, and 41C are fundamentally identical in configuration to the configuration information table 41. Moreover, the table 42C is basically the same in configuration as the containment relationship management table 42.

Figure 19:
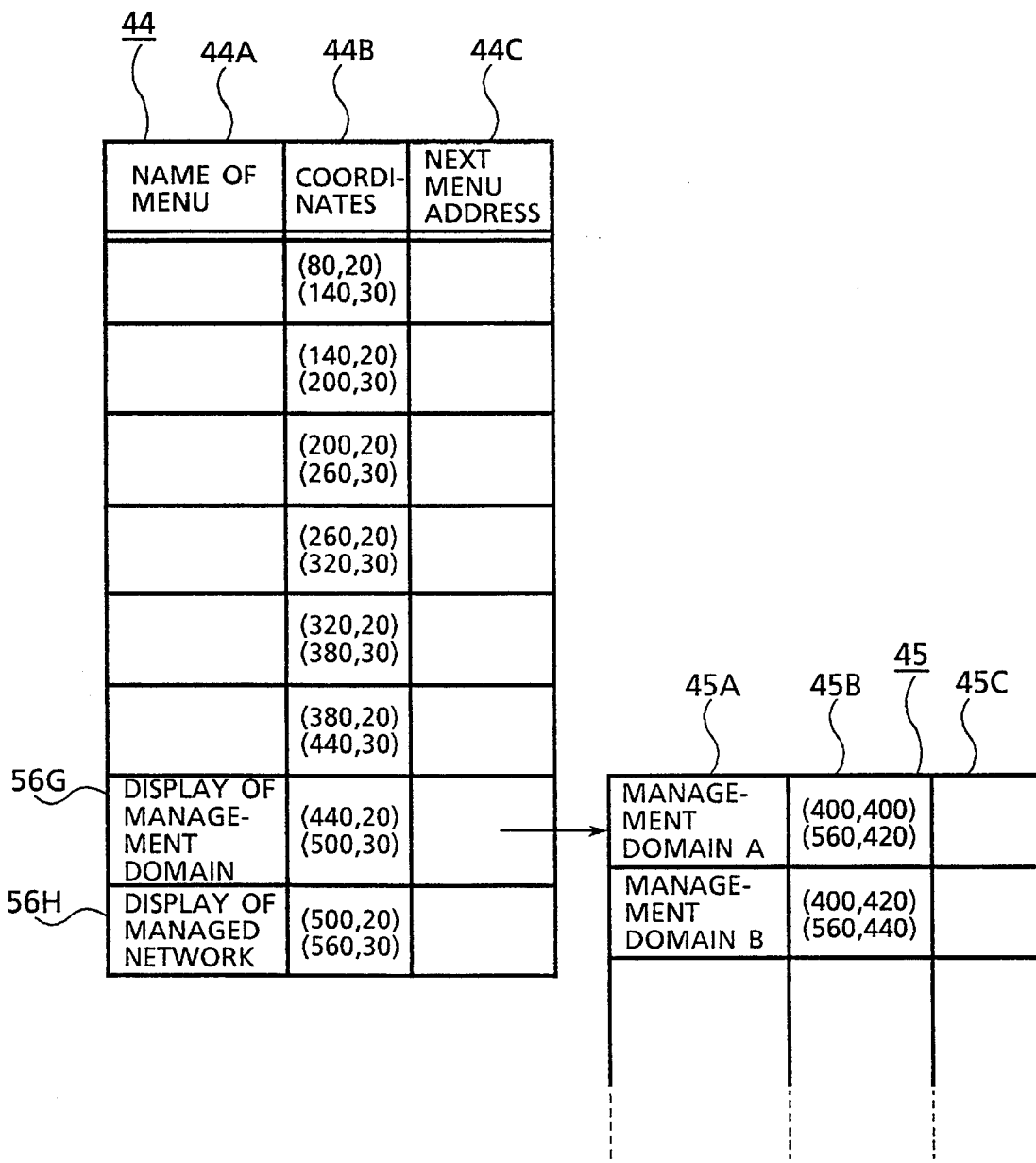
FIG. 19 is a diagram showing configuration examples respectively of a menu information table and a menu attribute table.

FIG. 19 shows the structures respectively of the menu information table 44 and the menu attribute table 45.

The table 44 is disposed to manage data related to menus displayed in the upper portion of the display screen and is constituted with a plurality of menu records prepared for the respective menus. Each record includes a menu name 44A, coordinates (of the upper-left and lower-right corners) 44B designating a display position of the menu on the display screen, and an address 44C indicating the next menu record related to the pertinent menu.

On the other hand, the menu attribute table 45 is used to manage menu data for selecting items to be presented in the upper-right portion of the CRT 52 when the user picks a menu currently being displayed on the screen 52. Each record of this table 45 is constituted with data items 45A, 45B, and 45C, which are similar to those of the record of the menu information table 44. In this example, the menu information table 44 includes two menus, namely, a menu of "management domain display" 56G and a menu of "managed network display" 56H. In the menu attribute table 45 corresponding to the menu 56G, there are prepared a menu for selecting "management domain A" and a menu for selecting "management domain B".

Figure 20:
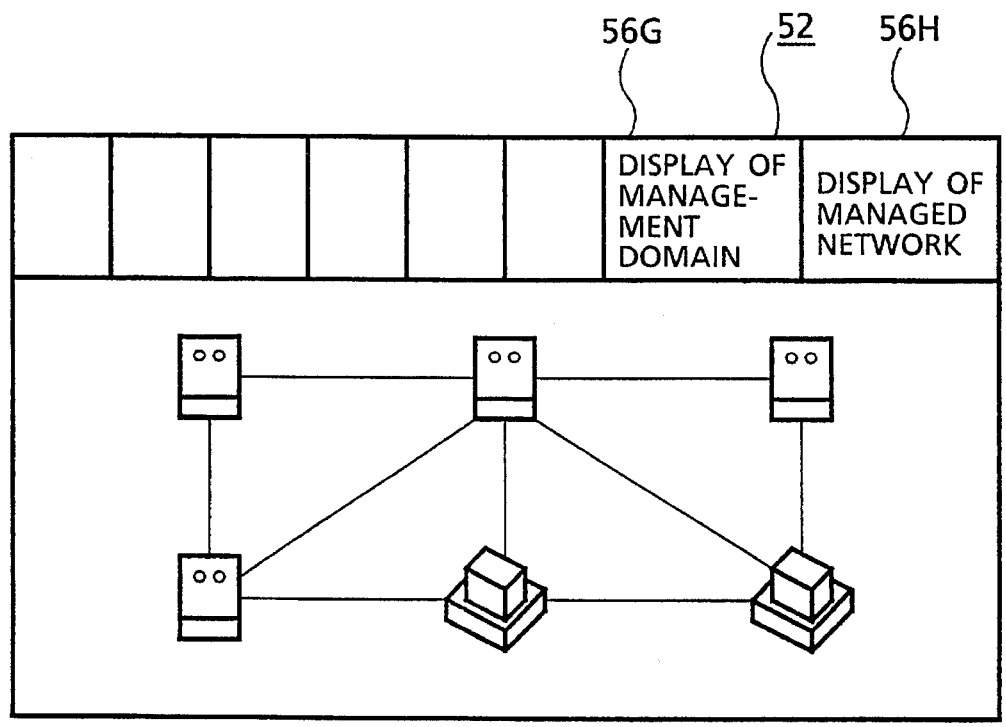
FIG. 20 is a diagram showing an alternative embodiment of the network display screen.

FIG. 20 shows an example of a display screen image presented in the network management system 30 of this embodiment. In the upper portion of the screen, the management domain display menu 56G and the managed network display menu 56H are displayed; whereas, in the central portion of the screen, the network configuration is presented in a similar manner as for the first embodiment.

When it is desired to display the network configuration for each management domain, the user specifies the managed domain display menu 56G by the cursor. In response thereto, the network management unit 60 compares the coordinates of the cursor position with the coordinates 44B obtained from the menu information table 44 to determine the specified menu region 56G. According to the contents of the definitions in the menu attribute table 45 denoted by the next menu address, a management domain type menu ("management domain A" and "management domain B") is displayed in the lower-right portion of the screen. The user then selects an item associated with the management domain to be displayed.

In response to the menu selection, the network management unit 60 conducts an operation in a similar manner as above. Namely, the unit 60 determines the management domain (A or B) specified by the cursor according to the contents of the menu attribute table 45, thereby accessing the configuration information table 41B and the containment relationship management table 42B which are associated with the specified management domain. As a result of the table access, like the network configuration diagram of FIG. 20 created according to the configuration information table 41 and the containment relationship management table 42, a network configuration diagram including only the resources or managed object instances in the specified management domain is generated to be displayed on the screen.

Figure 21:
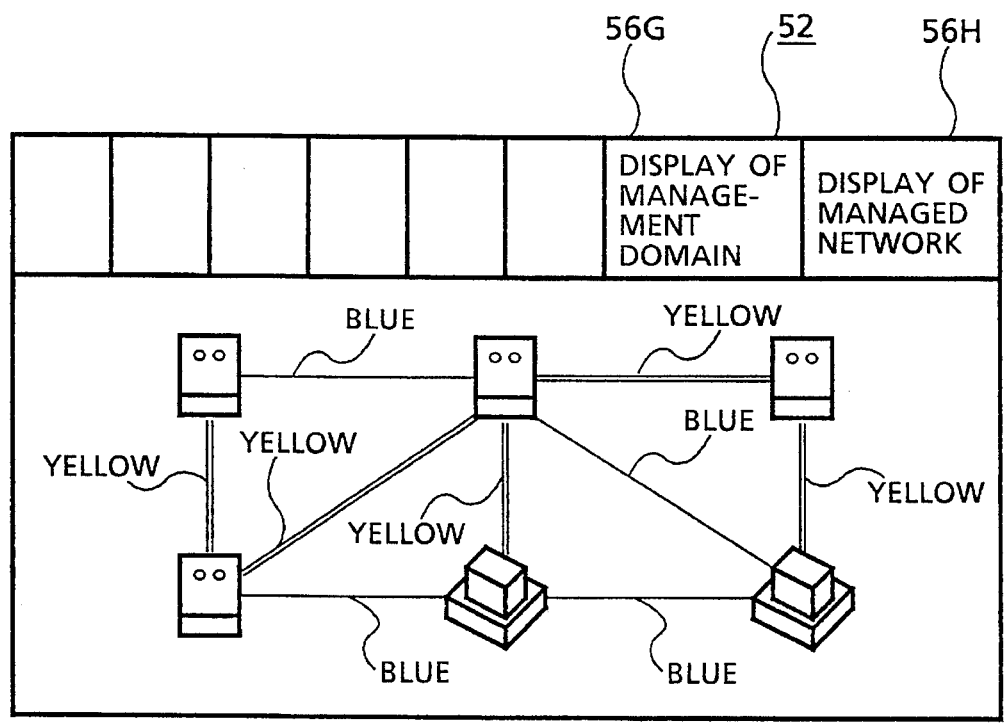
FIG. 21 is a diagram showing an example of a managed network display screen.

When it is desired to visually check the management network in the display state of FIG. 20, the user moves the cursor to specify the management network display menu 56H. In this case, the network management unit 60 accesses the tables 41C and 42C to generate a screen image as shown in FIG. 21. Namely, of the communication network, the portions currently being used as components of the managed network (the portions indicated by double lines) are displayed, for example, in yellow, and the other portions (indicated by single lines) are presented, for example, in blue.

According to the embodiment, the user can easily recognize the network configuration of each management domain and the configuration of the managed network.

As can be clearly understood from the description above, according to the network management system and the display method of the present invention, the managed object instances are displayed on the screen through a filtering operation. Consequently, there can be removed the disadvantage that important information items are lost among less important information items, which leads the user to a confused state when accessing actually essential information items.

Moreover, when the state of a managed object instance not displayed on the screen, namely, concealed from the view is desired to be obtained, the user specifies a desired item from the menu or picks a desired icon to easily display a desired screen image. In addition, not only in a case of a fault in a managed object instance being displayed on the screen but also in a case of a fault in a managed object instance concealed from the view, the occurrence of the fault can be notified to the user.

While particular embodiments of the invention have been shown and described, it will be obvious to those skilled in the art that various changes and modifications may be made without departing from the present invention in its broader aspects.

We claim:

1. A network status display method for use in a communication network management system including display means having a display screen for displaying a network layout thereon, first storing means for storing therein network configuration information defining connection relationships between a plurality of managed object instances constituting the network, second storing means for storing therein containment relationship information beforehand defined between the plural managed object instances and information representing a display priority beforehand defined for each of the managed object instances, and data processing means for executing an information processing operation according to predetermined programs, the method comprising the steps of:

calculating for each of the managed object instances an evaluated value for display according to a predetermined algorithm based on the containment relationship information beforehand defined between the plural managed object instances and the information representing a display priority beforehand defined for each of the managed object instances stored in the second storing means;

selecting a number of managed object instances in a descending order of the evaluated values thus calculated for the respective instances wherein the selected instances are limited to a first set of the managed object instances having at least a predetermined value of display priority and wherein a second set of the managed object instances having an evaluated value less than said predetermined value are determined to be concealed, the selected instances being representable on the display screen;

generating a layout diagram indicating a network status including a plurality of icons representing the plural selected instances and lines denoting connection relationships between the icons, the relationships being determined according to the network configuration information stored in the first storing means; and displaying the layout diagram on the display screen.

2. A method according to claim 1 in which the network management system includes pointing means for specifying a position on the display screen, further comprising the steps of:

selecting, when a user specifies by the pointing means either one of the icons in the layout diagram presented on the display screen, from a group of instances including a particular managed object instance designated by the specified icon and lower-ranking managed object instances contained in a range of the particular managed object instance, a group of instances including a limited number of new managed object instances representable on the display screen in a descending order of the evaluated values for display thus determined according to the predetermined algorithm;

generating a layout diagram denoting a network status including a plurality of icons representing the selected group of instances and lines indicating connection relationships between the icons, the relationships being determined in accordance with the network configuration information stored in the first storing means; and displaying the layout diagram on the display screen, thereby displaying on the screen a group of managed object instances having a lower display priority and having been concealed on the screen so far.

3. A method according to claim 1, further comprising the steps of:

displaying in advance in a first display format on the screen icons representing the managed object instances in the layout diagram;

changing, when a fault occurs in a managed object instance corresponding to either one of the icons being displayed on the screen, a state of the icon into a second display format; and changing, when a fault occurs in a managed object instance not being displayed on the screen, a state of a particular icon being displayed on the screen into a third display format, the icon being associated with a managed object instance which is arranged at a level higher than that of the faulty instance and which is determined according to the containment relationship information stored in the second storing means.

4. A method according to claim 3, further including the step of displaying, when a fault occurs in a managed object instance not being displayed on the screen, in the proximity of the particular icon changed into the third format, numeric information which indicates a hierarchy difference between a managed object instance represented by the particular icon and the faulty instance and which is determined according to the containment relationship information stored in the second storing means.

5. A network management system comprising:

display means having a display screen for displaying a network status thereon;

first storing means for storing therein network configuration information defining connection relationships between a plurality of managed object instances constituting the network;

second storing means for storing therein containment relationship information beforehand defined between the plural managed object instances and information representing a display priority beforehand defined for each of the managed object instances;

data processing means for executing an information processing operation for the network management and displaying on the display screen information indicating the network status, the data processing means including:

means for calculating for each of the managed object instances an evaluated value for display according to a predetermined algorithm based on the containment relationship information beforehand defined between the plural managed object instances and the information representing a display priority beforehand defined for each of the managed object instances stored in the second storing means;

means for selecting a limited number of managed object instances in a descending order of the evaluated values thus calculated for the respective instances, the instances being representable on the display screen and;

means for generating a layout diagram indicating a network status including a plurality of icons representing the plural selected instances and lines denoting connection relationships between the icons and displaying the layout diagram on the display screen, the relationships being determined according to the network configuration information stored in the first storing means.

6. A system according to claim 5, wherein the means for calculating the evaluated value calculates, when there exist two managed object instances having an identical display priority and an identical hierarchy level in a containment relationship tree, the value for each of the managed object instances in accordance with an algorithm giving a higher evaluated value for display for one of the instances which has a managed object instance at a deeper hierarchy level as compared with other one thereof.

7. A system according to claim 5, further including pointing means to be operated by a user for specifying a position on the display screen, wherein:

the means for calculating the evaluated value selects, when a user specifies by the pointing means either one of the icons in the layout diagram presented on the display screen, from a group of instances including a particular managed object instance designated by the specified icon and lower-ranking managed object instances contained in a range of the particular managed object instance, a group of instances including a limited number of new managed object instances representable on the display screen in a descending order of the evaluated values for display thus determined according to the predetermined algorithm; and the generating means generates a layout diagram denoting a network status including a plurality of icons representing the selected group of instances and lines indicating connection relationships between the icons, the relationships being determined in accordance with the network configuration information stored in the first storing means and displaying the layout diagram on the display screen, thereby displaying on the screen a group of managed object instances having a lower display priority and not being displayed on the screen.

8. A system according to claim 5, further comprising:

means for receiving a fault report message from the network; and means for judging to determine, when a fault report message is received, whether or not a faulty managed object instance indicated by the message corresponds to either one of the icons being displayed on the screen; for changing, when the fault is associated with one of the icons, a state of the icon into a second display format; and for changing, when the fault is associated with a managed object instance not being displayed on the screen, a state of a particular icon being displayed on the screen into a third display format, the icon being associated with a managed object instance which is arranged at a level higher than that of the faulty instance and which is determined according to the containment relationship information stored in the second storing means.

9. A system according to claim 8, further including means for displaying, when a fault occurs in a managed object instance not being displayed on the screen, in the proximity of the particular icon changed into the third format, numeric information which indicates a hierarchy difference between a managed object instance represented by the particular icon and the faulty instance and which is determined according to the containment relationship information stored in the second storing means.

10. A system according to claim 8, further including means for judging to determine whether or not a fault importance of a faulty managed object instance indicated by the fault report message exceeds a predetermined threshold value, the means for changing the display format operating in accordance with a result of the judgement by the judging means.

11. A network management system in which a portion of a network including a plurality of managed object instances are included is adopted as a managed network for communicating therethrough network management information, comprising:

display means having a display screen for displaying a network status thereon;

first storing means for storing therein network configuration information defining connection relationships between a plurality of managed object instances constituting the network;

second storing means for storing therein containment relationship information beforehand defined between the plural managed object instances and information representing a display priority beforehand defined for each of the managed object instances;

data processing means for executing an information processing operation for the network management and displaying on the display screen information indicating the network status, the data processing means including:

means for calculating for each of the managed object instances an evaluated value for display according to a predetermined algorithm based on the containment relationship information beforehand defined between the plural managed object instances and the information representing a display priority beforehand defined for each of the managed object instances stored in the second storing means;

means for selecting a limited number of managed object instances in a descending order of the evaluated values thus calculated for the respective instances, the instances being representable on the display screen;

means for generating a layout diagram indicating a network status including a plurality of icons representing the plural selected instances and lines denoting connection relationships between the icons and displaying the layout diagram on the display screen, the relationships being determined according to the network configuration information stored in the first storing means; and means for selectively changing a portion of lines representing the connection relationships in the layout diagram, the portion constituting the managed network, into a display state to be discriminated from that of lines representing network portions other than the managed network portion.

* * * * *